(12) United States Patent
Kostanian

(10) Patent No.: US 6,446,815 B2
(45) Date of Patent: *Sep. 10, 2002

(54) MULTIPLE PHASE EXTRACTOR

(75) Inventor: Artak Eranosovich Kostanian, Leverkusen (DE)

(73) Assignee: Bayer Aktiengesellschaft, Leverkusen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/043,784
(22) PCT Filed: Oct. 11, 1996
(86) PCT No.: PCT/EP96/04422
§ 371 (c)(1),
(2), (4) Date: Mar. 26, 1998
(87) PCT Pub. No.: WO97/14486
PCT Pub. Date: Apr. 24, 1997

(30) Foreign Application Priority Data

Oct. 19, 1995 (RU) .............................. 95117766
Oct. 19, 1995 (RU) .............................. 95117767

(51) Int. Cl.⁷ .............................................. B01D 11/04
(52) U.S. Cl. ...................................... 210/511; 422/256
(58) Field of Search ................................. 210/511, 634; 422/256

(56) References Cited

U.S. PATENT DOCUMENTS

| | | |
|---|---|---|
| 1,951,787 A | 3/1934 | Child et al. |
| 2,023,109 A | 12/1935 | Van Dijck |
| 2,813,011 A | 11/1957 | Weber |
| 2,851,396 A | 9/1958 | Myers |
| 3,165,384 A | 1/1965 | Reid |
| 3,857,919 A | 12/1974 | Hazen |
| 4,293,387 A | 10/1981 | Winter |

FOREIGN PATENT DOCUMENTS

| | | | |
|---|---|---|---|
| FR | 355465 | * 11/1905 | ................. 210/634 |
| FR | 1 571 433 | 6/1969 | |

* cited by examiner

*Primary Examiner*—Matthew O. Savage
(74) *Attorney, Agent, or Firm*—Norris McLaughlin & Marcus

(57) ABSTRACT

The multi-phase extractor comprises at least two chambers 1, 1a, 2, 2a which are connected at their upper and lower parts by connection ducts 4. Moreover, the chambers are equipped with dispersing devices 3, 4a, in order to produce a swarm of drops in a first and second dispersed phase. Furthermore, ports 8, 9, 10, 11, 8a, 9a, 10a, 11a are attached to the multi-phase extractor for the supply and removal of the first and second dispersed phases. The improvement resides substantially in the fact that the chambers 1, 2 comprise separation zones 6,7 located in the area of the inlet openings of the connecting ducts 4.

5 Claims, 2 Drawing Sheets

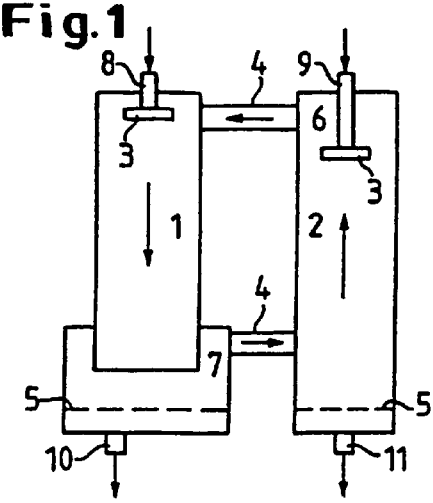
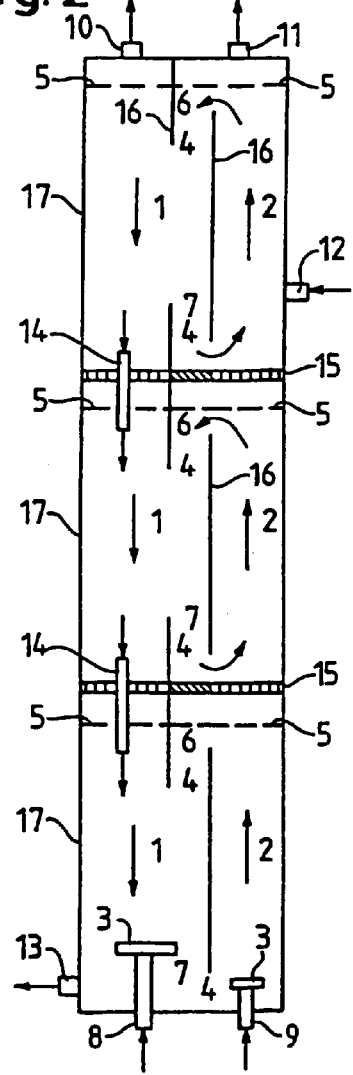
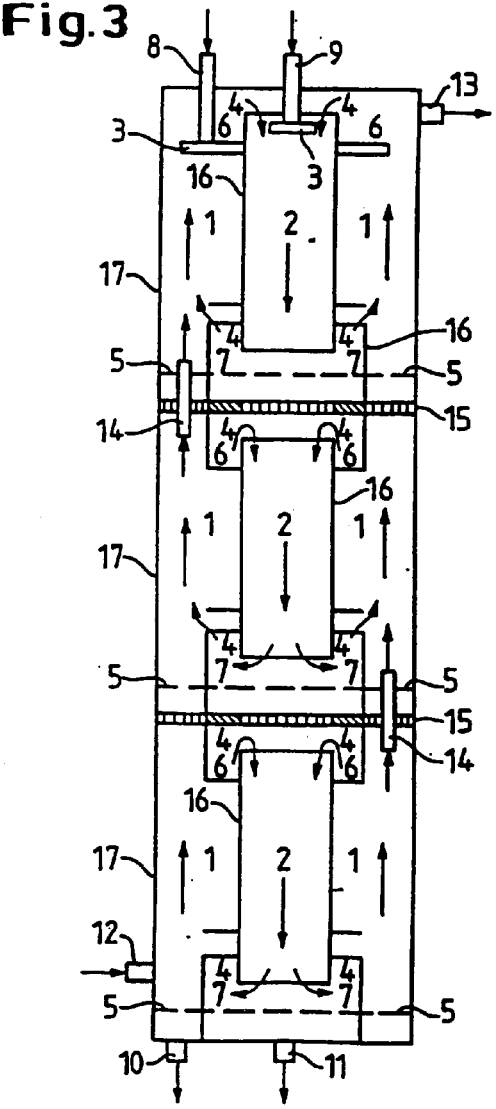

MULTIPLE PHASE EXTRACTOR

The invention relates to a multi-phase extractor having at least two chambers which are connected at their upper and lower parts by connection ducts, are equipped with dispersing devices and comprise ports for the supply and removal of a first, second and optionally third dispersed phase.

A multi-phase extractor of this type may be used in chemical, hydrometallurgical, microbiological and other branches of industry for separating, extracting, concentrating and purifying substances.

Apparatuses for carrying out processes of three-phase fluid extraction are known in the form of a two-chamber system, wherein the two chambers are connected together at the upper part or comprise a porous partition. The chambers are filled with a continuous phase, through which two dispersed phases, which are not soluble in the continuous phase, are passed in the form of drops. This results in the transfer of substances from one dispersed phase (raffinate phase) via the continuous phase (also known as the liquid membrane phase) into the other dispersed phase (extract phase) (c.f. for example Journal *"Theoretische Grundlagen der chemischen Technologie"* 1984, Vol. 18; No. 6, pp. 736–738).

These apparatuses are in need of improvement with respect to their performance and their extension to multi-stage processes.

From a technical point of view, as well as from that of the achievable effect, the three-phase extractor, which consists of a first and second chamber filled with the continuous phase (liquid membrane), is closest to the known apparatuses. The chambers have devices for dispersing the respective phase and are connected together by overflows for circulation of the continuous phase. The overflows take the form of pipes which connect together the upper and lower parts of the chambers. The extractor is provided with ports for the supply and removal of the first and second dispersed phases (Russian patent application no. 94-015776/26 (015406) of 27.04.94).

The phase to be dispersed, i.e. the initial solution, and the solvent (extract phase) are each dispersed into droplets in the appropriate chamber by means of a dispersing device, said droplets moving together through the continuous phase. Owing to the difference in density between the emulsions in the first and second chamber, circulation of the continuous phase occurs via the upper and lower overflows, resulting in transfer of the substance to be extracted from one chamber to the other and from the first phase to be dispersed into the second.

A disadvantage of the known three-phase extractor resides in the fact that droplets of the dispersed phase may be entrained from one chamber to the other by the circulating continuous phase. This phenomenon, which results in a reduction in the efficiency of the apparatus and to contamination of the extract phase, is reinforced in particular if the ratio between the flow rates of the raffinate phase and the extract phase increases as a result of an increase in circulation momentum (difference between the densities of the emulsions in the first and second chambers).

Another disadvantage is that it is impossible to carry out continuous multi-component extraction in this extractor, i.e. the extractor cannot be used for processes in which selective separation of multi-component mixtures is required (isolation of individual components from an initial solution).

In the case of the extraction and concentration of substances from dilute solutions, e.g. metals from waste waters, the ratio of the flows of the raffinate and the extract may be higher than 2–10. The design of the known extractor does not permit any increase in efficiency in such instances.

The object of the invention is to improve the efficiency of the multi-phase extractor. A further object of the invention is to develop a multi-phase extractor for carrying out continuous multi-component extraction.

Starting with the above-described apparatus, this object is achieved according to the invention in that the two chambers in the multi-phase extractor comprise separation zones, which are located in the area of the inlet openings for the connection ducts.

According to a preferred embodiment, the second chamber is connected at its upper and lower parts with a third chamber.

The chambers are advantageously accommodated in a housing and separated by a common partition.

A modification of the invention is characterised in that, beneath a first stage with the chambers connected at their upper and lower parts, there are arranged further stages connected in series and having interconnected chambers, wherein the individual stages are connected together by means of perforated plates (sieve plates) through which the dispersed phases flow.

The multi-phase extractor is preferably provided with connecting pipes in the perforated plates to convey the continuous phase between the individual stages and with ports in the housing for supply and removal of the continuous phase.

The embodiment comprising separation zones or separating chambers arranged in the area of the inlet openings of the connecting ducts or overflows prevents the circulating flow of the continuous phase from entraining droplets from one chamber to the other. The arrangement of the two chambers in a housing subdivided by a common partition also contributes to this. In this instance, the cross sections of the connecting ducts constructed as overflows is substantially increased and the flow rate of the continuous phase at the transition from one chamber to the other decreased.

The connection of the second chamber with the third provides a fundamentally novel multi-chamber system with a common central second chamber. In conjunction with the ports for the inlet and removal of the third dispersed phase and the dispersing devices, this design permits the implementation of continuous multi-component extraction processes.

The connection between the chambers at their upper and lower ends permits the implementation of various technological variants of the process. For example, the second phase to be dispersed may be used as the initial solution. The components separated therefrom then transfer via the continuous phase into the first and third dispersed phases. Alternatively, the initial mixture may be supplied in the form of the continuous phase, wherein the various components of this continuous phase are extracted via the various dispersed phases.

The additional arrangement of chamber of like design below the first and second chamber (series connection of several stages) permits the implementation of multistage substance separation processes in the multi-phase extractor. The embodiment of the extractor with ports for the supply and removal of the continuous phase and connection pipes to convey it between the stages establishes the prerequisites for the implementation of separation processes by means of the liquid membrane method and three-phase extraction.

FIGS. 1–3 are schematic representations of three possible variants of the three-phase extractor according to the invention and FIGS. 4–6 show further embodiments of a multi-phase extractor.

FIG. 1 shows a single-stage extractor for carrying out processes for separating substances by means of a circulating continuous phase of fixed location, which acts as a liquid membrane.

FIGS. 2 and 3 are multi-stage three-phase extractors, in which the chambers are accommodated in a housing.

Figure 4:
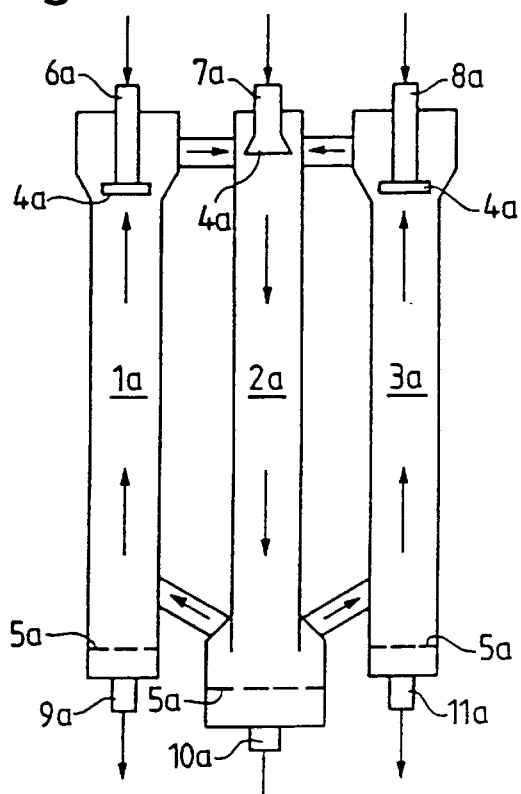

In the extractor according to FIG. 2, the chambers are subdivided in the separation stages by a common partition in the form of vertical walls 16. In the extractor according to FIG. 3 this partition takes the form of a central, concentric pipe 16. In this instance, the one chamber 1 is arranged in the annular outer chamber and the other chamber 2 is arranged in the central pipe 16, such that the extractor is constructed in the manner of a cylindrical column apparatus.

In all its embodiments, the three-phase extractor principally comprises the first 1 and the second chamber 2, which are both provided with a dispersing device 3. In their upper and lower parts, the chambers 1 and 2 are connected by connecting ducts or overflows 4. Depending on the dispersed phase, the phase boundary between the phases brought into contact must lie above or below the connections between the chambers 1 and 2. The chambers 1 and 2 of the three-phase extractor comprise separation zones or separating chambers 6 and 7, which are attached to the inlet openings of the connecting ducts 4 or overflows. The extractor is equipped with ports 8 and 9 for the supply and ports 10 and 11 for the removal of the first and second dispersed phases.

The multi-stage extractor according to FIGS. 2 and 3 comprises a system of series-connected further chambers 1 and 2, which are arranged below the uppermost first 1 and second chambers 2. There are further provided a port 12 for the supply and a port 13 for the removal of the continuous phase and connecting pipes 14 for conveying the continuous phase (from stage to stage) between the upper and lower chambers. The chambers 1 and 2 of different states are connected together via the perforated plates 15 (sieve plates), which serve as dispersing devices between adjacent chambers. Within one stage the chambers 1 and 2 are separated by the common partition 16, which is arranged respectively above a lower and below an upper perforated plate 15.

The principle underlying the operation of the three-phase extractor is as follows: The first and second chambers are filled with the continuous phase. The first and second phases to be dispersed are fed into the chambers via the ports 8 and 9 and the dispersing devices 3. Depending on the densities of the liquids to be brought into contact, the droplets of the dispersed phase move upwards or downwards in the chambers 1 and 2 and coalesce at the phase interface 5. The dispersion and coalescence processes are repeated in each stage in the multistage apparatus. Dispersion of the phase to be dispersed in the chambers of the second and subsequent stages (according to the movement of the phase currents) is achieved by the perforated plates 15. The two dispersed phases are removed from the extractor by means of the ports 10 and 11.

As the drops move together through the chambers 1 and 2, emulsions of different densities form. As a consequence the continuous phase develops ascending motion and on the other side descending motion. This results in circulation of the continuous phase between the chambers 1 and 2 via the separation zones 6 and 7, which are attached to the inlet openings of the connections 4.

As the continuous phase flows through the separation zones 6 and 7 in the chambers 1 and 2, small droplets of the dispersed phase entrained by the continuous phase are separated off. In this way, losses in efficiency suffered by the separation process as a result of the mixing of the flows of the first and second dispersed phases may be markedly reduced.

The entrainment or carrying-over of the droplets of the dispersed phase depends on the flow rate of the continuous phase in the separation zones 6 and 7 and the connection 4. As a result of the subdivision of the chambers 1 and 2 by the partition arranged in the housing (FIGS. 2 and 3), the cross section of the connections 4 is substantially increased, such that the speed of the continuous phase is further reduced and thus even better separation of the droplets is achieved. In this connection, use is made of a simple and effective construction of the separation zones 6 and 7 in the form of a liquid overflow (hydraulic layer) for the dispersed phases.

The three-phase extractor may be used as a device for separating substances by means of liquid membranes as well as an apparatus for multi-phase extraction. In the first instance, the initial solution (raffinate phase) is fed into the chambers 1 and 2 in the form of a dispersed phase. The substance to be extracted is extracted by the continuous phase. The substance extracted by the circulating continuous phase (which here acts as a liquid membrane) is transferred into the other chamber, where reextraction by the second dispersed phase (extract phase) is effected. The circulating continuous phase may be of fixed location (FIG. 1) or through-flowing (FIGS. 2, 3). In the latter instance, the initial solution, which contains at least two components, is supplied to the extraction via the ports 12 (FIGS. 2, 3) and the components of various types to be extracted are extracted via the different dispersed phases in the chambers 1 and 2. In the multi-stage column apparatus counter-current contacting of the continuous and dispersed phases occurs. The continuous phase flows from stage to stage via the connecting pipes 14 between the upper and lower chambers and leaves the apparatus through the port 13.

The above-described multi-phase extractor permits effective implementation of separation processes with large and varying ratios between the raffinate and extract phases.

FIG. 4 shows a single-stage extractor for multi-component extraction processes. The densities of all the dispersed phases have here to be greater than the density of the continuous phase. The continuous phase is the raffinate or feed phase; the dispersed phases represent the extract phase. All the chambers of the extractor are arranged in a column, as shown in FIGS. 5 and 6.

Figure 6:
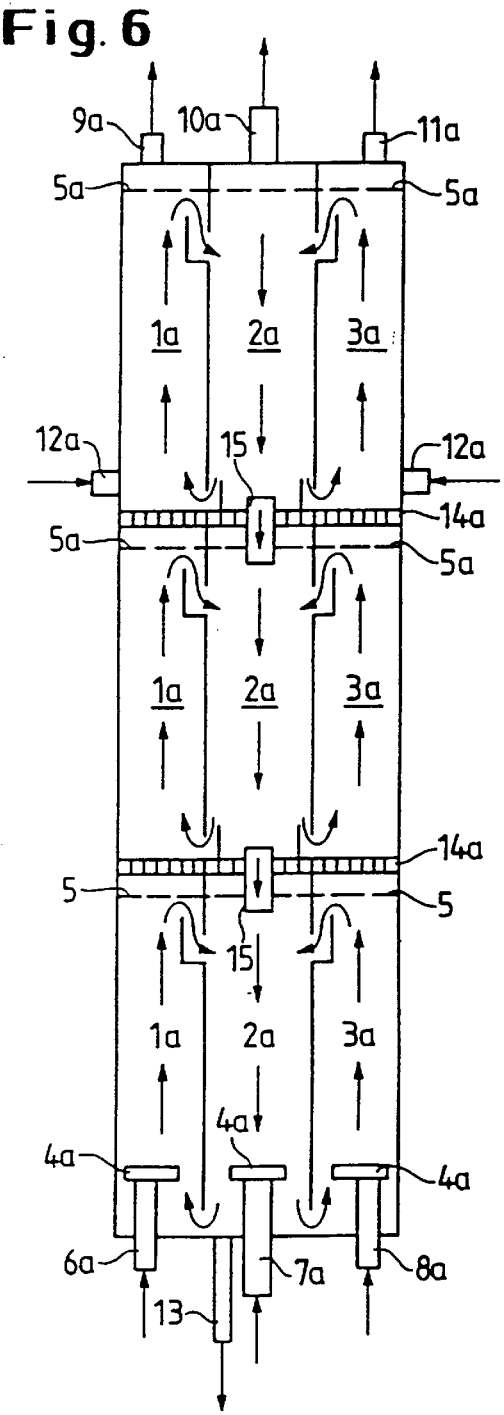

The sectional drawing according to FIG. 6 shows an embodiment in which the chambers are arranged in a cylindrical column. The first and third chambers, 1a and 3a respectively, are accommodated in an annular chamber, while the second chamber 2a is accommodated in the central pipe.

Figure 5:
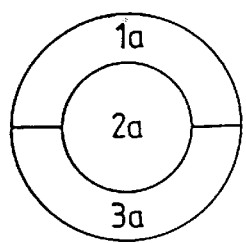

The multi-phase extractor according to FIGS. 4–6 basically consists of the first, second and third chambers, 1a, 2a and 3a respectively, which are each equipped with a dispersing device 4a. The first and third chambers, 1a and 3a respectively, are connected at their upper and lower part to the second chamber 2a. The extractor is provided with the ports 6a, 7a, 8a for the supply and 9a, 10a, 11a for the removal of the first, second and third dispersed phases.

The multi-stage extractor according to FIG. 5 is provided with additional chambers 1a, 2a and 3a, which are arranged below the three chambers of the uppermost stage. It is also provided with ports 12a for the supply and 13a for the removal of the continuous phase.

The principle underlying the operation of the multi-phase extractor according to FIGS. 4–6 is as follows:

The first, second and third chambers, 1a, 2a and 3a respectively, are filled with the continuous phase. The first, second and third phases to be dispersed are supplied via the ports 6a, 7a and 8a and the dispersing devices 4a. Depending on the density of the liquids to be brought into contact, the drops of the disperse phases move upwards or downwards in the chambers 1a, 2a and 3a and coalesce at the phase interface. In the multistage extractor the dispersion and coalescence processes are repeated in each stage. Dispersion of the phase to be dispersed in the chambers of the second and subsequent stages is achieved by passage through the perforated plates 14a which separate the chambers of the adjacent stages. The first, second and third phases are removed via the ports 9a, 10a and 11a.

As a consequence of the difference in density between the emulsions in the chambers 1a, 2a and 3a, the continuous phase develops a descending motion in the second chamber 2a and an ascending motion in the first and third chambers, 1a and 3a respectively, which results in circulation between the chambers via the upper and lower connections (cf. FIGS. 4 and 5). The achievement of countercurrent circulation is also possible. In this instance, the ascending motion occurs in the chambers 2a and the descending motion in the chambers 1a and 3a.

As a result of the connection of the second chamber 2a with the third chamber 3a in the multi-chamber system, the continuous phase is caused to effect several circulating circuits starting from the chamber 2a, mixing of the flows also occurring as they arrive, which enables distribution of the components of the initial solution between the various dispersesd phases.

What is claimed is:

1. A multi-phase extractor comprising:
    at least two chambers, defined by at least one housing, said at least two chambers being a first chamber and a second chamber, said chambers having top and bottom sections, upper ends and lower ends;
    a first overflow duct having a first open end disposed at the top section of said first chamber and a second open end disposed at the top section of the second chamber,
    a second overflow duct having a first end disposed at the bottom section of said first chamber and a second open end disposed at the bottom section of said second chamber, whereby said first and second overflow ducts provide for a circulation of a continuous phase between the chambers;
    wherein said first chamber has an inlet port at one of said upper and lower ends for feeding a first disperse phase to said first chamber and an outlet port at the other of said upper and lower ends for removal of said first disperse phase from said first chamber, and
    said second chamber has an inlet port at one of said ends for feeding a second disperse phase to said second chamber, and an outlet port at the other of said ends for removal of said second disperse phase from said second chamber;
    each said inlet port having dispersing devices connected thereto and disposed within the sections of the chambers that are adjacent to ends of the chambers where said inlet ports are located to disperse said first and second disperse phases; and
    wherein said first and second chambers comprise separation zones which are located at the ends of each chamber at which the overflow ducts for circulating continuous phase into the other chamber are connected.

2. An apparatus according to claim 1, further comprising a third chamber, wherein said second and third chambers are connected at upper and lower ends with third and fourth overflow ducts, respectively.

3. An apparatus according to claim 1, wherein the chambers are defined by and accommodated in a single housing and are separated by a common partition.

4. An apparatus according to claim 3, wherein beneath a first stage with interconnected chambers, there are arranged further stages connected in series and having interconnected chambers, wherein the individual stages are connected together by perforated plates through which the dispersed phases flow.

5. An apparatus according to claim 4, wherein connecting pipes are attached to the perforated plates to convey the continuous phase between the individual stages and in that said inlet and outlet ports are arranged on the housing for the supply and removal of the continuous phase.

* * * * *